United States Patent [19]

Kar et al.

[11] Patent Number: 5,761,439
[45] Date of Patent: Jun. 2, 1998

[54] METHOD AND APPARATUS FOR SYNCHRONIZING COMMUNICATIONS BETWEEN NETWORKED COMPUTERS

[75] Inventors: Rabindra P. Kar, Beaverton; Kenneth W. Reese, Portland, both of Oreg.

[73] Assignee: Intel Corporation, Santa Clara, Calif.

[21] Appl. No.: 533,564

[22] Filed: Sep. 25, 1995

[51] Int. Cl.[6] .................................................. G06F 1/12
[52] U.S. Cl. ........................... 395/200.78; 395/200.63
[58] Field of Search ........................... 395/700, 200.4, 395/200.19, 200.78, 200.63; 375/356, 365

[56] References Cited

U.S. PATENT DOCUMENTS

| | | | |
|---|---|---|---|
| 3,879,580 | 4/1975 | Schlosser et al. | 325/4 |
| 4,353,130 | 10/1982 | Carasso et al. | 375/114 |
| 4,538,263 | 8/1985 | Gabrielli et al. | 370/86 |
| 5,003,559 | 3/1991 | Kanai | 375/109 |
| 5,007,050 | 4/1991 | Kasparian et al. | 370/77 |
| 5,349,654 | 9/1994 | Bond et al. | 395/575 |
| 5,371,534 | 12/1994 | Dagdeviren et al. | 348/14 |
| 5,374,952 | 12/1994 | Flohr | 348/12 |
| 5,428,647 | 6/1995 | Rasky et al. | 375/366 |
| 5,487,066 | 1/1996 | McNamara et al. | 370/85.2 |

OTHER PUBLICATIONS

Trudy Miller, "Internet Reliable Transaction Protocol Functional and Interface Specification.", Network Working Group, RFC 938, Feb. 1985 pp. 1–16.

Greenberg et al, "NFILE. A File Access Protocol", Network Working Group, RFC 1037, Dec. 1987 pp. 1–86.

Armstrong et al, "Multicast Transport Protocol", Network Working Group, RFC 1301, Feb. 1992, pp. 1–38.

R. Braden, "Extending TCP for Transactions–Concepts", Network Working Group, RFC 1379, Nov. 1992, pp. 1–38.

*Primary Examiner*—Mehmet B. Geckil
*Attorney, Agent, or Firm*—Blakely, Sokoloff, Taylor & Zafman

[57] ABSTRACT

In a computer network including a first computer communicatively coupled with at least a second computer through data and control channels, wherein each of the first and second computers are provided with an application program, a communication program and a synchronization program. In each of the first and second computers, the communication program is provided between the application program and the data and control channels, while the synchronization program is provided between the application program and the communication program. The synchronization program including means for sequentially forwarding commands and data units received from the application program of the same computer to the communication program of the same computer for transmission to another computer as corresponding control and data signals on the control and data channels, respectively. The synchronization program further comprising means for synchronizing the control signals and data signals sent on the control and data channels, respectively, by deferring sequential forwarding of a next sequential command to the communication program until an acknowledgment is received from the other computer acknowledging receipt of all previously transmitted control and data signals.

19 Claims, 7 Drawing Sheets

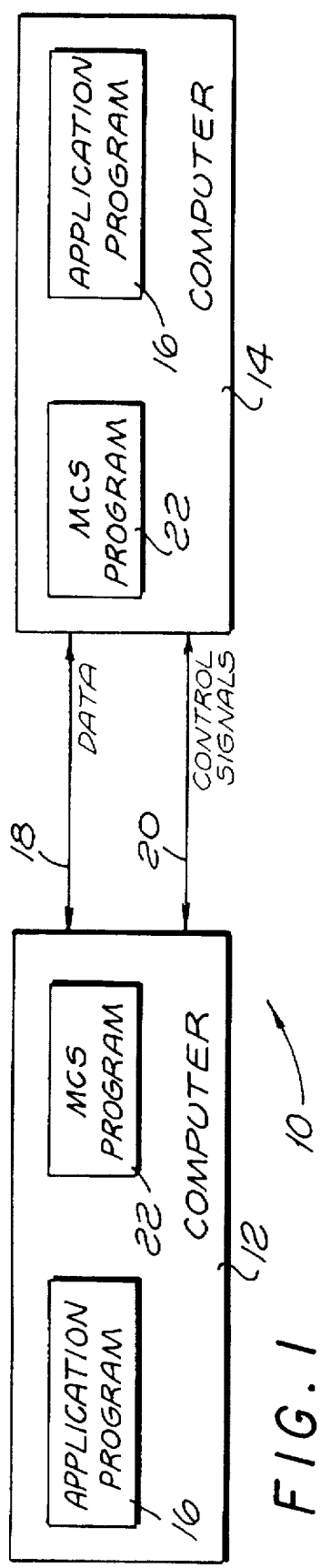
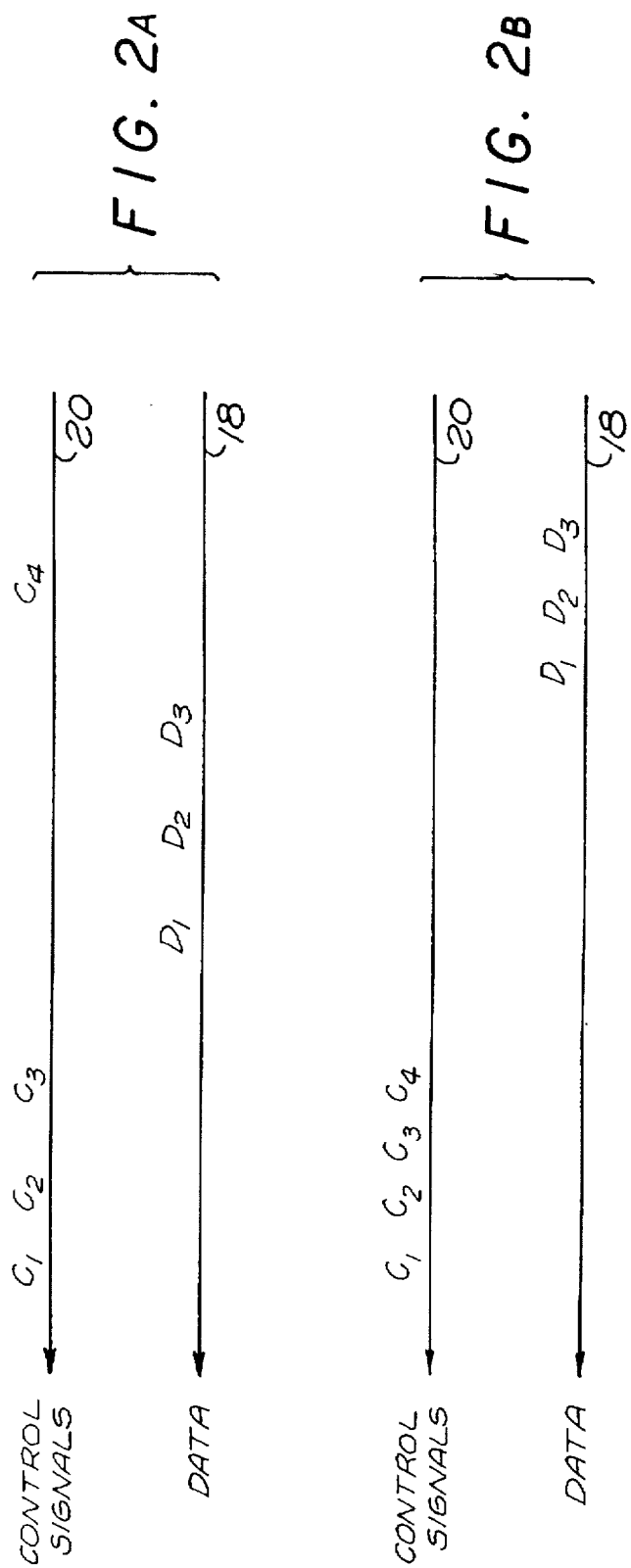

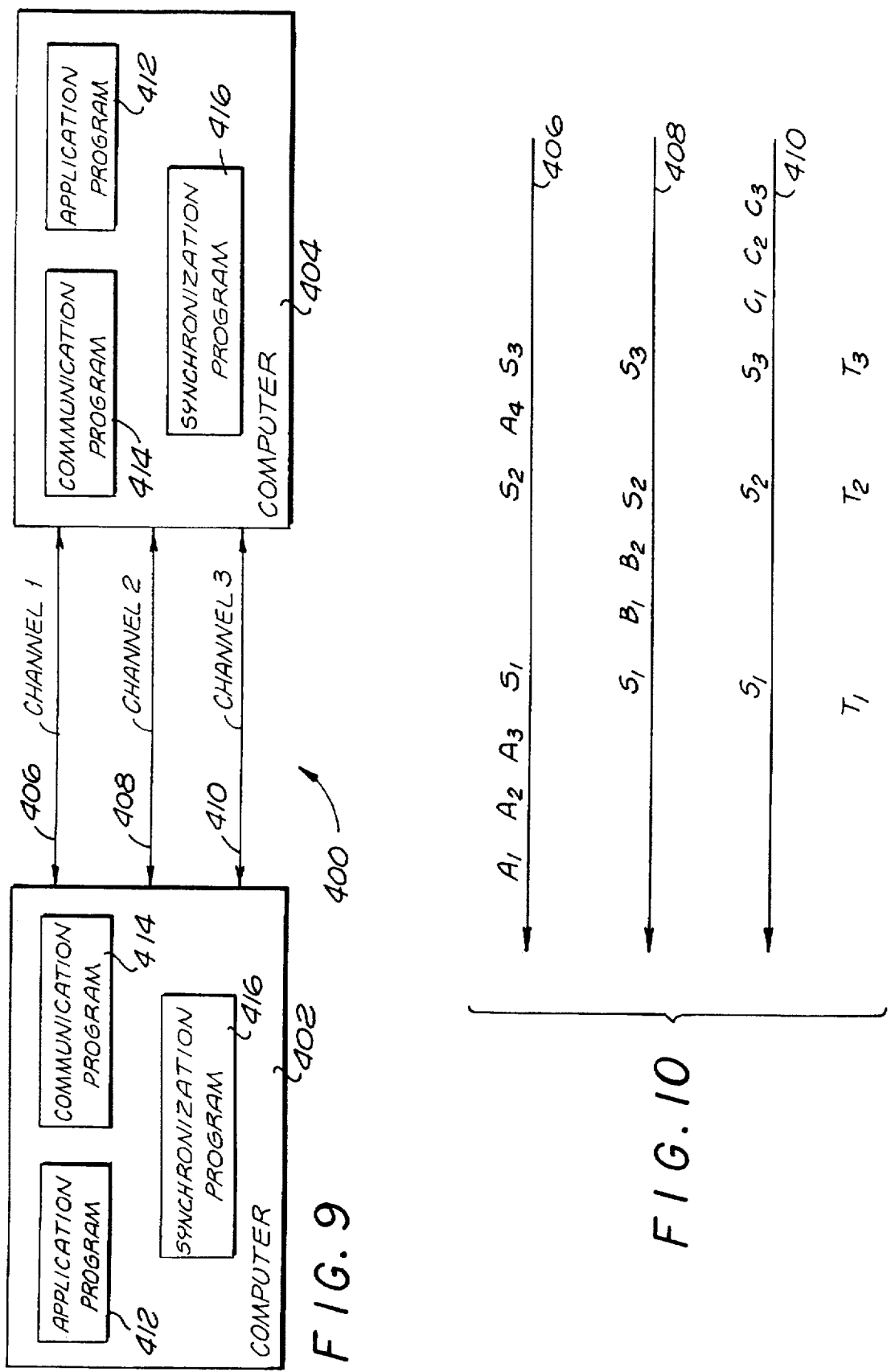

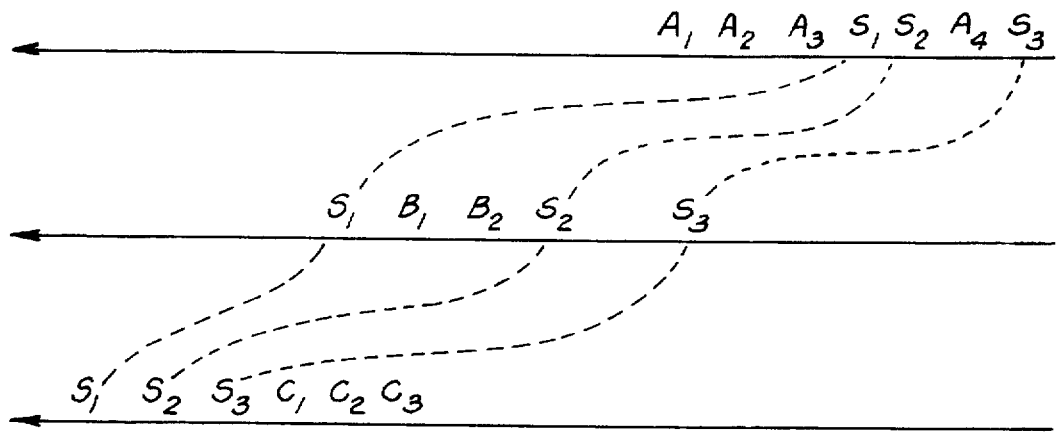
FIG. 11
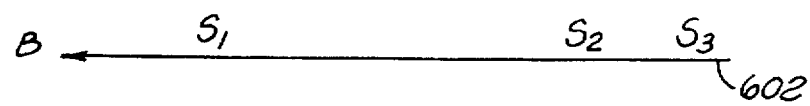
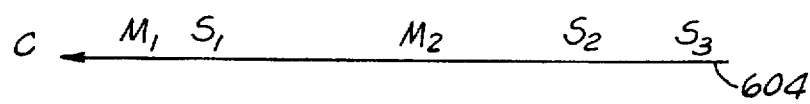
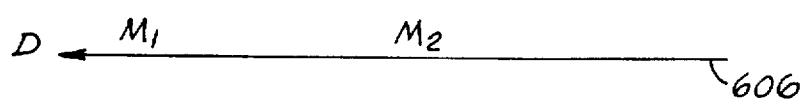
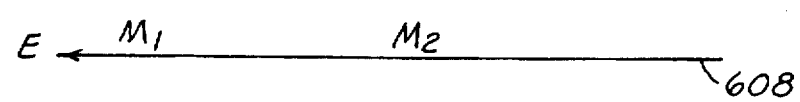
FIG. 13

METHOD AND APPARATUS FOR SYNCHRONIZING COMMUNICATIONS BETWEEN NETWORKED COMPUTERS

BACKGROUND OF THE INVENTION

1. Field of the Invention

The invention generally relates to networked computers and in particular to the synchronization of signal transmission channels employed in communications between networked computers.

2. Description of Related Art

Computer networks for interconnecting two or more computers are becoming increasingly sophisticated. For example, some computer networks provide video conferencing services wherein video and audio information, as well as related control signals, are transmitted between networked computers. In one such network, a small video camera is mounted to the top of the display screen of each computer in the network. A microphone is also provided with each computer. A user, sitting in front of the display screen, communicates both audibly and visually with other users using other computers within the network. Computer software running within each of the computers of the network controls the transmission of the video and audio data, along with necessary control signals, to other computers within the network.

The International Telecommunications Union (ITU) has developed standard protocols for use in such systems for standardizing the manner by which data and control signals are transmitted between the networked computers. One standard protocol, which is becoming increasingly popular, is the multi-point communication service (MCS) standard T.122.

In accordance with the MCS standard, information is transmitted between networked computers via one or more logical channels with each channel carrying control signals and data signals. The control signals may relate to the creation and management of the channel such as signals identifying which computers of the network are authorized to receive information pertaining to the channel. For example, for a video conference, only a portion of the networked computers may be authorized to receive and display the video conference.

With the MCS standard, control signals between MCS programs on different computers are transmitted over a control channel. Data signals, which may include video and audio information, are transmitted over separate data channels. However, the transmission of control and data signals are not synchronized with one another. The transmission rate of the control channel may be faster than that of the data channel. Control signals transmitted subsequent to data signals therefore may be received by a receiving computer prior to reception of the data signals. Such can result in loss of data or, depending upon the specific implementation, complete failure of software operating within the received computer. This problem will be described further with reference to FIGS. 1 and 2.

FIG. 1 illustrates a simplified computer network 10 having two networked computers 12 and 14. Both of the networked computers include application software programs, perhaps configured for controlling a video conference. The application software programs communicate with each other through an MCS network having a physical data transmission channel 18 and a separate physical control signal transmission channel 20. It should be noted, however, that the system does not require physically separate transmission channels for the data and control signals. Rather, the data and control signals may merely be transmitted over logically separate transmission channels.

An MCS software program or layer 22 operates as an interface between the application programs and the physical interconnection channels 18 and 20. In use, the application programs forwards data units to the associated MCS layer for subsequent transmission over the interconnection channels as corresponding data signals. The application program also forwards commands to the MCS layer for transmission over the interconnection channels as corresponding control signals. The control signals are processed only by the MCS programs of the respective computers and are not forwarded to the corresponding application programs.

The commands and data units signals are typically provided by the application program in a time dependent sequence, whereby the application program expects that subsequently transmitted corresponding control and data signals will be processed by the MCS layer of the receiving computer in the order transmitted. For example, the application program on computer 12 may provide commands for convening a data channel, then provide data associated with the channel such as video or audio data, and finally provide commands for terminating the channel. The application program expects that the audio and video data will be received by the MCS layer of the receiving computer and forwarded to the application program of the receiving computer before the control signals specifying termination of the channel are processed by the MCS layer of the receiving computer.

As noted above, however, the MCS protocol does not ensure that the time dependency of control and data signals transmitted on the separate control on data channels is maintained. In other words, the control and data channels are asynchronous. Moreover, for state of the art systems, the control channels may transmit information faster than the data channels. As such, control signals may be received by the MCS program of a receiving computer before previously transmitted data signals are received and processed. Hence, in the example, it is quite possible that control signals specifying termination of the channel will be received and processed by computer 14 before the audio or video data is received. This is further illustrated in FIGS. 2A and 2B.

FIG. 2A illustrates a sequence by which control signals and data signals are output from an application program running on a transmitting computer. Three control signals C1, C2 and C3 are transmitted before data signals D1, D2 and D3. After the data is transmitted, a final control signal C4, which may trigger termination of the data channel, is transmitted. FIG. 2B illustrates a sequence by which the various signals may be actually received by the receiving computer, in an implementation where the transmission of control signals is faster than that of data signals. As can be seen, all of the control signals, including control signal C4, are received before any of the data signals are received. If processed in the order received, the corresponding data channel will be terminated upon the reception of control signal C4. The subsequently received data signals are ignored, and the data is thereby lost.

Also, although FIG. 2B shows all control signals being received prior to all data signals, some of the control signals may require fairly lengthy processing such that some of the control signals transmitted before the data signals may not actually be processed by the MCS program of the receiving computer until after subsequently transmitted data signals are processed. Such can result in further synchronization problems.

Accordingly, it would be desirable to provide a method and apparatus for maintaining synchronization of data and control signals transmitted in accordance with MCS protocol, or in accordance with similar transmission protocols, wherein time dependent information corresponding to control and data signals are transmitted on two or more channels asynchronously. It is to these ends that certain aspects of the present invention are drawn.

The foregoing describes the problems arising in synchronizing separate data and control channels. Similar synchronization problems may arise between data signals transmitted on two separate data channels. In general, synchronization problems may arise in any computer network transmitting signals over two or more channels wherein the transmission rates of the channels may differ. FIG. 3 illustrates a computer network 100 having a pair of networked computers 102 and 104 interconnected by three transmission channels A, B and C. The transmission channels may be physically separate transmission lines or merely logically separate transmission channels. In general, channels A, B and C have different data transmission rates. For example, signals transmitted on channel B from computer 102 may be received by computer 104 before previously transmitted signals transmitted by computer 102 on channel A.

FIG. 4A illustrates the sequence by which signals may be transmitted on channels A, B and C from computer 102. As can be seen, signals A1 and A2 are transmitted along channel A, then signals B1, B2 and B3 are transmitted along channel B before a third signal A3 is transmitted on channel A. Finally, signals C1 and C2 are transmitted on channel C.

FIG. 4B illustrates the order in which the signals may be actually received by computer 104 given that the transmission rates of the various channels differ. As can be seen, signals B1, B2 and B3 are received first, then signals C1 and C2, and finally signals A1, A2 and A3.

Depending upon the specific implementation, if the receiving computer processes the signals in the order received, rather than in the order transmitted, problems may arise. For example, in a computer network incorporating a video conferencing system, signals transmitted over channels A, B and C may relate to different types of graphics commands to be performed on the display, screen of the receiving computer. Confusion on the part of users operating the receiving computer may occur if the graphics commands are performed in the order received rather than in the order transmitted. In other systems, more serious problems may result if signals are not processed in the order transmitted but in the order received. For example, software receiving and processing the commands may not function properly, resulting in loss of data, presentation of erroneous data or perhaps complete software operational failure.

Accordingly, it would be desirable to provide a method and apparatus for ensuring that signals received over multiple channels are processed in the order transmitted, rather than in the order received. It is to these ends that additional aspects of the present invention are drawn.

SUMMARY OF THE INVENTION

In accordance with a first aspect of the invention, a method and apparatus is provided for synchronizing communications between data and control channels interconnecting networked computers. In one embodiment, employing an MCS layer or other communication program, the foregoing is achieved by providing a synchronization program between application programs running on each of the networked computers and the associated MCS layer. The synchronization program receives command and data units provided by the application program and selectively forwards the commands and data units to the communication program for subsequent transmission as corresponding control signals and data signals. As such, the synchronization program includes means for sequentially forwarding commands and data units to the MCS layer. The synchronization program also includes means for deferring forwarding of a next sequential command to the MCS layer until an acknowledgment is received from a receiving computer acknowledging receipt of all previously transmitted control and data signals. The acknowledgment includes one acknowledgment signal corresponding to each control signal and a further acknowledgment signal corresponding to the last of the previously transmitted data signals. In other words, once a set of data signals have been transmitted, the transmitting computer does not transmit the next sequential control signal until an acknowledgment signal is received indicating receipt of the last of the set of data signals. A separate acknowledgment is also required for each control signal. The synchronization program waits for an acknowledgment from a previously transmitted control signal before forwarding the next sequential command.

With this arrangement, even if the transmission rate of the control signal channel is substantially faster than that of the data signal channel, a receiving computer will not receive control signals in advance of previously transmitted data signals.

In an exemplary embodiment, a group or block of sequential commands followed by all data units prior to a next sequential command together comprise a software object or similar software data structure maintained by the synchronization program. When a channel is convened, an initial primary object is created which includes commands pertaining to the creation of the channel, data units associated therewith, and state information. The primary object remains in use until the channel is closed. Subsequent blocks or groups of commands and data units are stored in secondary objects which are transitory and are discarded once acknowledgments are received acknowledging receipt of all control signals and the last data signal within the secondary object. A link list is provided to link the primary object and any existing secondary objects together.

In accordance with a second aspect of the invention, a method and apparatus is provided for synchronizing the transmission of information between separate channels. In one exemplary embodiment, the foregoing is achieved by generating sequences of units of data for transmission on the plurality of data channels, with each unit of data associated with only one of the data channels. Units of data associated with a first data channel are sequentially transmitted until units of data for transmission on a second data channel are detected. Then, a unique synchronization token or packet is transmitted on all data channels. Data corresponding to the second data channel is then sequentially transmitted until information for transmission on another channel is detected. A different unique synchronization token is transmitted on all channels. Transmission of further units of data proceeds in the same manner.

Hence, synchronization tokens are transmitted on all channels whenever a transition is detected between the transmission of data on one channel to another channel.

In the exemplary embodiment, the transmitted data is received and resynchronized as follows. A receiving computer receives and stores the units of data and synchronization tokens received on all channels. The receiving computer examines the order of reception of units of data and synchronization tokens and determines therefrom the order by which the units of data were originally transmitted. Then, the receiving unit outputs or processes the units of data in the order transmitted. The order by which units of data were transmitted may be determined by the receiving computer by logically resynchronizing or realigning the received synchronization tokens, then determining the order of data units on the various channels relative to the realigned synchronization tokens. For example, the receiving computer may first determine which channel provided data units between first and second synchronization tokens, then determine which channel provided data between second and third synchronization tokens. Because data is transmitted on only one channel between any two adjacent pairs of synchronization tokens, the receiving unit can therefore determine that the data received between the first and second synchronization tokens was transmitted before data received between these second and third synchronization tokens, and so on.

In this manner, the initial order by which the units of data were transmitted can be reconstructed. Units of data, which may include control commands, are then processed by the receiving computer in the order transmitted, rather than in the order received. Depending upon the implementation, a large number of channels may be defined with different channels corresponding to different channel groups. Synchronization of data units transmitted over channels within one group is performed separately from the synchronization of data units for channels of other groups. Any one channel may provide data units corresponding to two or more channel groups. Different synchronization tokens are applied to different channel groups to allow the synchronization program to separately resynchronized data units corresponding to different channel groups even if transmitted over the same channels.

BRIEF DESCRIPTION OF THE DRAWINGS

FIG. 1 is a block diagram illustrating a simplified computer network connected by a data channel and a control signal channel.

FIG. 2A is a timing diagram illustrating the transmission of exemplary signals over the channels of FIG. 1.

FIG. 2B is a timing diagram illustrating the reception of exemplary data signals received over the channels of FIG. 1.

FIG. 9 is a block diagram of a second exemplary computer network having a pair of computers interconnected by three data channels.

FIG. 10 is a timing diagram illustrating the transmission of signals, including synchronization tokens, along the three channels of FIG. 9.

FIG. 11 is a timing diagram illustrating the reception of data signals and synchronization tokens transmitted over the three channels of FIG. 9.

FIG. 13 is a timing diagram illustrating the transmission of synchronization signals corresponding to two channel groups over a total of five channels.

DETAILED DESCRIPTION OF EXEMPLARY EMBODIMENTS OF THE INVENTION

Referring to FIGS. 5–13, exemplary embodiments of the invention will now be described. A first embodiment of the invention, related to the synchronization of data and control signals will be described with reference to FIGS. 5–8. Then, a second embodiment of the invention, related to the synchronization of data signals between two or more channels, will be described with reference to FIGS. 9–13. The exemplary embodiments are primarily described with reference to block diagrams, flow charts and timing diagrams. As to the flow charts, each block within the flow charts represents both a method step and an apparatus element for performing the method step. Herein, the apparatus element may be referred to as a means for, an element for, or a unit for performing the method step. Depending upon the implementation, the apparatus element may be configured in hardware, software, firmware or combinations thereof.

Figure 3:
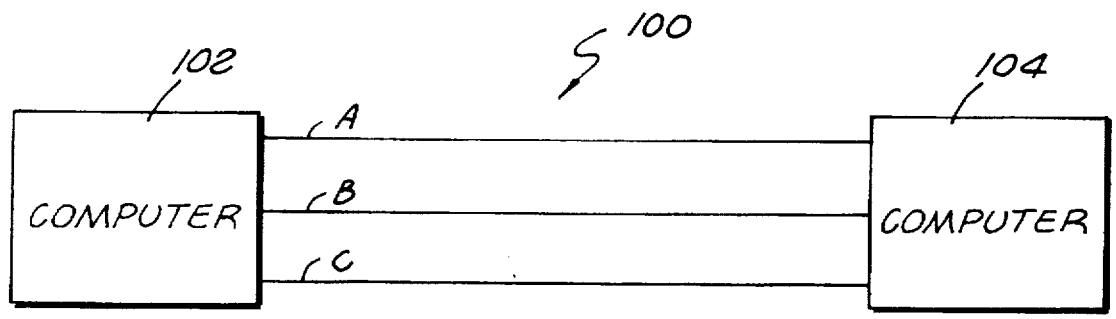
FIG. 3 is a block diagram illustrating a simplified computer network employing three separate transmission channels.
Figure 4A:
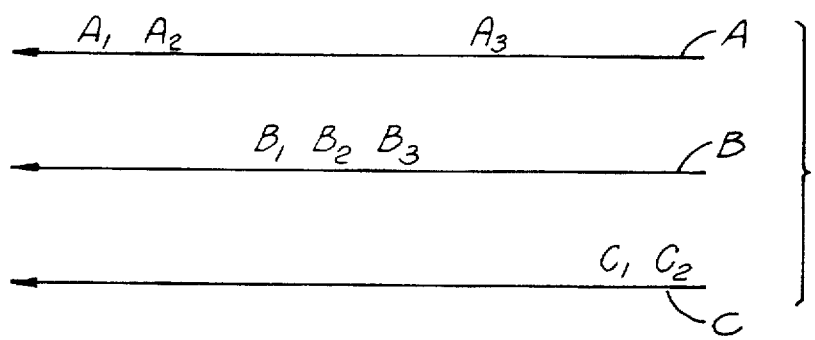
FIG. 4A is a timing diagram illustrating the transmission of exemplary signals over the three channels of FIG. 3.
Figure 4B:
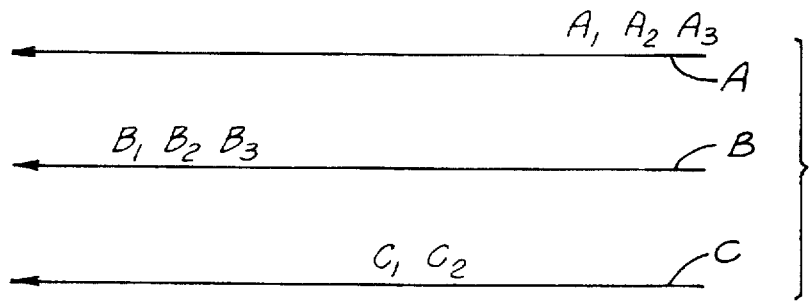
FIG. 4B is a timing diagram illustrating the reception of signals transmitted over the three channels of the computer network of FIG. 3.
Figure 5:
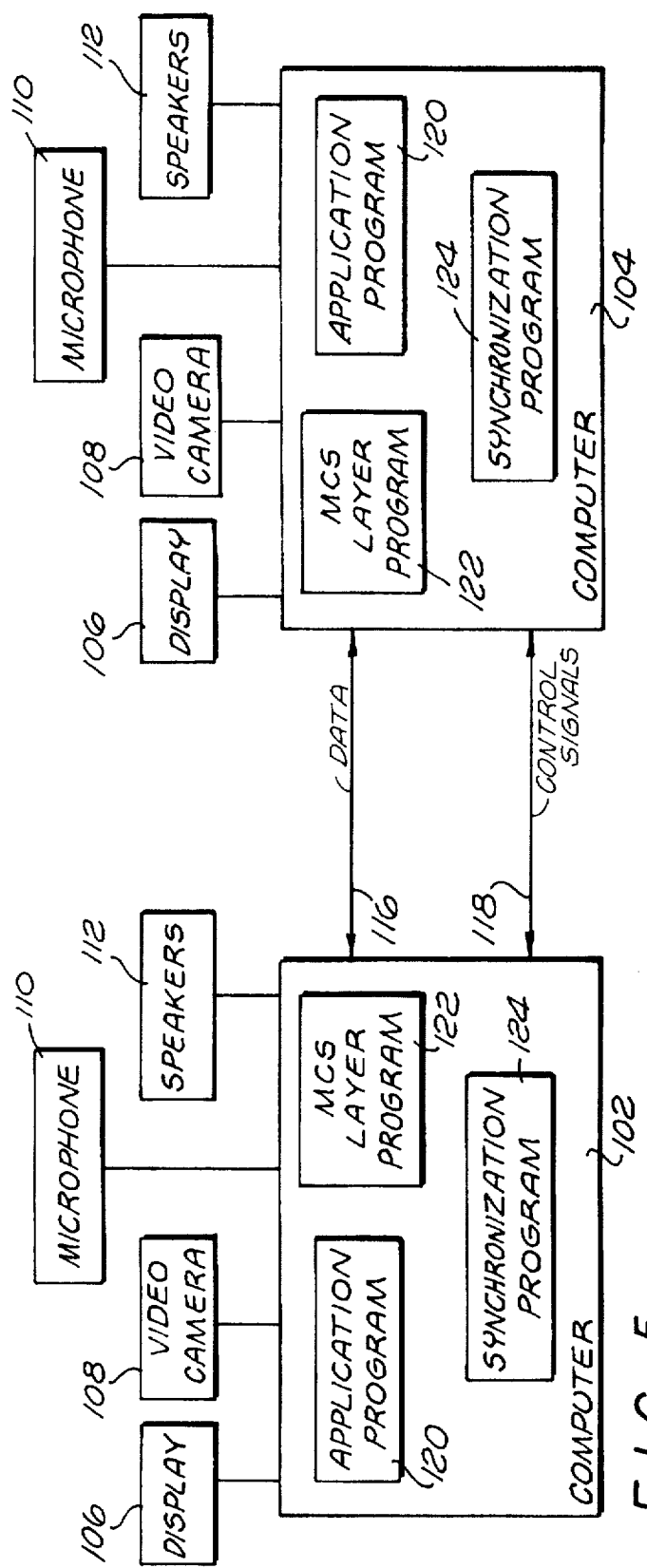
FIG. 5 is a block diagram of a first exemplary computer network, configured in accordance with an exemplary embodiment of the invention, having a pair of computers connected by a data channel and a control signal channel.

FIG. 5 illustrates a computer network system 100 having a pair of computers 102 and 104 which may be, for example, personal computers or workstations. Each computer includes a display monitor 106, a video camera 108, a microphone 110 and one or more speakers 112, all shown in block diagram form. With this equipment, the computer network system may be employed for performing video conferencing. However, the network may be utilized to perform any number of other functions or applications, as well.

Computers 102 and 104 are shown interconnected by a data channel 116 and a control signal channel 118. In practical systems, data and control signals corresponding to additional logical channels may be carried over the data and control channels. Likewise, more than one set of data and control channels may be provided. In still other circumstances, only a single physical interconnection line may carry both the data and control signals. However, for the purposes of describing the invention, only a single control channel and a single data channel will be described.

Computers 102 and 104 both run three distinct computer programs: an application program 120, an MCS layer communication program 122 and an application services (AS) interface layer or synchronization program 124. In one implementation, the application program is a video conferencing program for receiving video and audio from video camera 108 and microphone 110, transmitting the video and audio to other computers within the network, and for displaying the video and audio received from the other computers, using display 106 and speaker 112.

The video and audio data, and associated control signals are transmitted using channels 116 and 118. MCS layer 122 interfaces with transmission channels 116 and 118 to facilitate actual transmission and reception of control and data signals. Synchronization program 124 acts as an interface between applications program 120 and MCS layer 122 to ensure that data and control signals transmitted using channels 116 and 118 remain synchronized even though control channel 116 may have a higher transmission rate than data channel 118. More specifically, the synchronization program receives sequentially generated commands and data units from applications program 120, then forwards the commands and data units to MCS layer 124 for subsequent transmission as corresponding control signals and data signals using channels 116 and 118. The commands and data units may comprise bit patterns of information, such as bytes, packets, cells or other groupings of information. The synchronization program "forwards" the commands and data units to the MCS layer by calling appropriate software routines provided as an interface to the MCS layer.

Synchronization program 122 sequentially forwards commands and data units to the MCS layer one at a time. The synchronization program waits before forwarding a next sequential command until an acknowledgment is received from the most recently transmitted control signal corresponding to the most recently forwarded command. In contrast, the synchronization program sequentially forwards an entire set of data units one after another, to the MCS layer, until a next command is received. Then, the synchronization program waits until receiving an acknowledgment indicating reception of the last of the set of data signals corresponding to the set of data units. By deferring forwarding of an additional command to the MCS layer of the transmitting computer until an acknowledgment of the reception of the last previously transmitted data signal is received, it is assured that control signals are not received out of order from data signals, even if the control signal transmission channel has a rate considerably faster than that of the data channel. In other words, control signals cannot be received and processed in advance of previously transmitted data signals. Moreover, because a separate acknowledgment is required for each control signal, control signals cannot be received and processed in advance of previously transmitted control signals.

Figure 6:
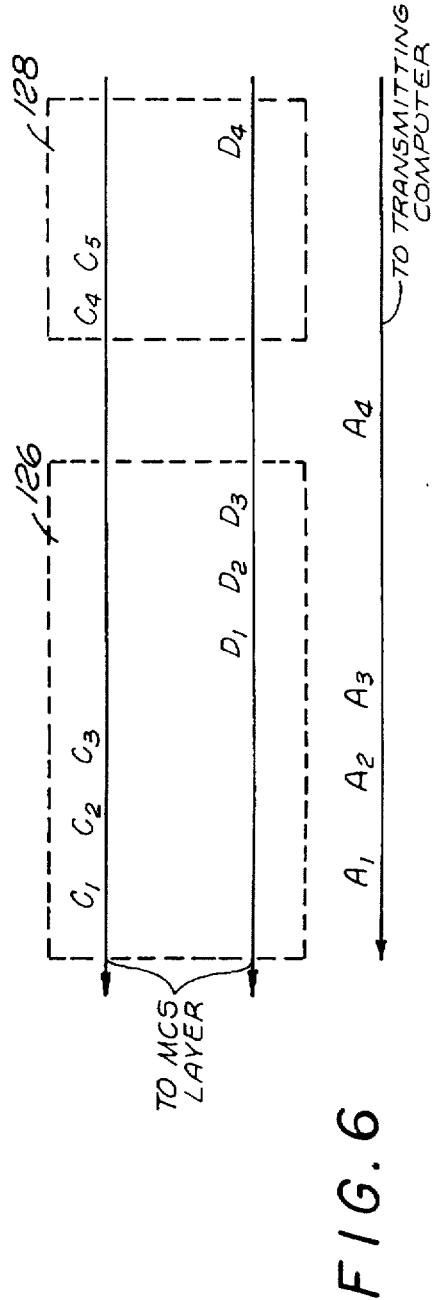
FIG. 6 is a timing diagram illustrating the transmission of exemplary data over the channels of FIG. 5 and also illustrating the reception of an acknowledgment signal received in response to transmitted data.

Herein, a group of sequential commands followed by all data units prior to a next sequential command are referred to as a "block" of commands and data units. FIG. 6 illustrates the forwarding of blocks of commands and data units triggered by the reception of acknowledgment signals. More specifically, a first block 126 is illustrated which includes commands C1, C2 and C3, and data units D1, D2 and D3. Synchronization program 122 receives the individual commands and data units, groups them-into a block, then sequentially forwards the commands and data units of the block to MCS layer 122 for transmission of corresponding control signals and data signals over control and data signal channels 116 and 118. It should be noted that reference herein to the term "block" is merely provided to clarify the groupings of commands and data units. Actual forwarding of the commands and data units of a single block is performed sequentially.

The control and data signals, corresponding to the commands and data units of block 126, are eventually received by the MCS layer of computer 104 and the data units are forwarded through synchronization program 124 to the application program of computer 104. The control signals are not forwarded to the synchronization program 124. However, the synchronization program 124 detects the reception of the control signals by the MCS layer by monitoring the status of the various channels upon which the control signals and data signals are transmitted. Synchronization program 124 also detects the reception of the last unit of data (D3) and transmits acknowledgment signals back to computer 102 for both the control signals and the last data signal. As noted, one acknowledgment signal is provided for each control signal and a separate acknowledgment signal is provided upon detection of reception of the last of a group of sequential data signals. The acknowledgment signals may take the form of data units provided within a return block.

In FIG. 6, separate acknowledgment signals A1, A2 and A3 correspond to commands C1, C2 and C3, respectively. A fourth acknowledgment signal A4 corresponds to the last of the data units of block 126 (D3). The acknowledgment signals transmitted by computer 104 are received by the MCS layer of computer 102, then forwarded to synchronization program 122, which then forwards commands and data units corresponding to a second block 128 (C4, C5 and D4) to the MCS layer for subsequent transmission of corresponding control signals and data signals to computer 104 after acknowledgment signal A4 has been received. Again, synchronization program 122 of computer 102 defers forwarding any subsequent commands and data units, until acknowledgment signals are received for each of the commands (C4 and C5) and data unit D4 of block 128.

Hence, commands and data units may be regarded as being arranged in blocks with each block containing one or more sequential commands followed by one or more sequential data units. A new block is generated whenever a command is received from the application program following one or more data units. Thus, a block never includes data units followed by commands, otherwise the relative order of reception of the corresponding control and data signals by the MCS layer of the receiving computer may differ from the order of transmission as a result of the differences in transmission rates.

Thus, FIG. 6 illustrates the grouping of commands and data units into blocks and their forwarding from synchronization program 124 to MCS layer 122 pending reception of sets of acknowledgment signals from computer 104. In a practical implementation, the synchronization program of computer 104 may be simultaneously forwarding blocks of commands and data units corresponding to different channels to the MCS layer of computer 104 pending receipt of sets of acknowledgment signals from computer 102. If more than two channels are employed, commands and data units for the different channels are grouped and forwarded separately and separate sets of acknowledgment signals are employed. Thus, forwarding of a block of commands and data units corresponding a first channel will not be deferred pending receipt of sets of acknowledgment signals for a block of commands and data units corresponding to another channel. Although not separately shown on the drawings, at the end of the last data signal of a group of sequential data signals, a special data signal is inserted which informs the receiving computer that the last data signal has been provided. In this manner, the receiving computer can promptly determine when the last of the data signals associated with the block has been received, triggering transmission of the "last data" acknowledgment signal.

Figure 7:
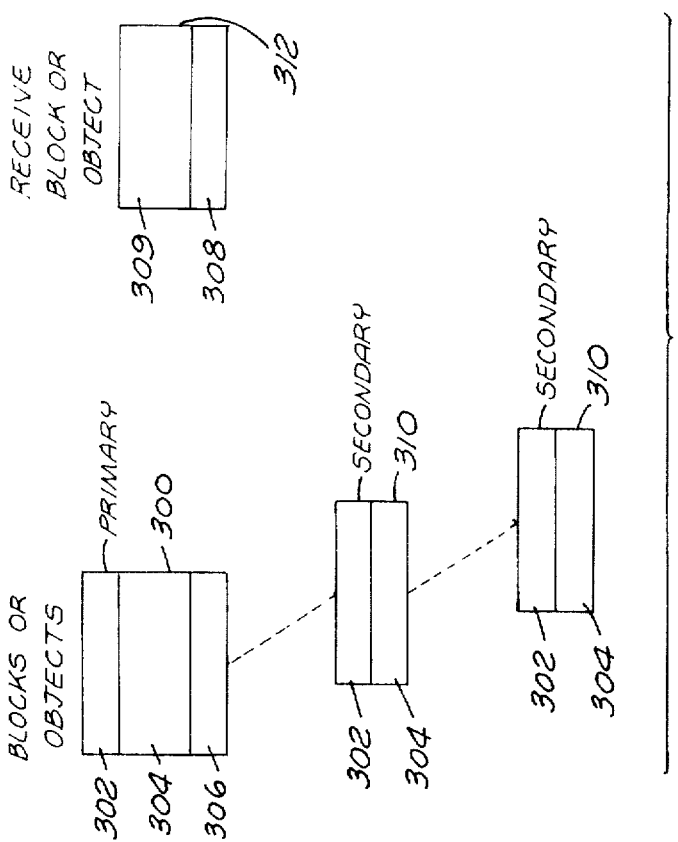
FIG. 7 is a flow chart illustrating a method performed by the computer network of FIG. 5 to provide proper synchronization of control and data signals.

Steps performed by the synchronization program are summarized in FIG. 7. Initially, at step 200, the synchronization program receives one or more sequential commands and one or more sequential data units from the application program. At step 202, the synchronization program forwards a commands to the corresponding MCS layer by forwarding each command individually, then waiting for an acknowledgment signal before forwarding a next command. Then at step 204, the synchronization program forwards a set of sequential data units by forwarding all data units one after the other until another command is detected for transmission. The synchronization program then waits, step 206, until an acknowledgment signal is received for the last of the set of data units. Once the acknowledgment signal is received for the last of the data units, execution returns to step 200 where the synchronization program receives and stores additional commands and data units for subsequent transference. The synchronization program may receive and store the commands and data units corresponding to many blocks while awaiting the acknowledgment signals from a first block. Once all acknowledgment signals are received from the first block, the synchronization program simply forwards the commands and data units corresponding to a second block to the MCS interface layer. Hence, at any one time, the synchronization program may store and manage a large number of blocks of commands and data units.

Figure 8:
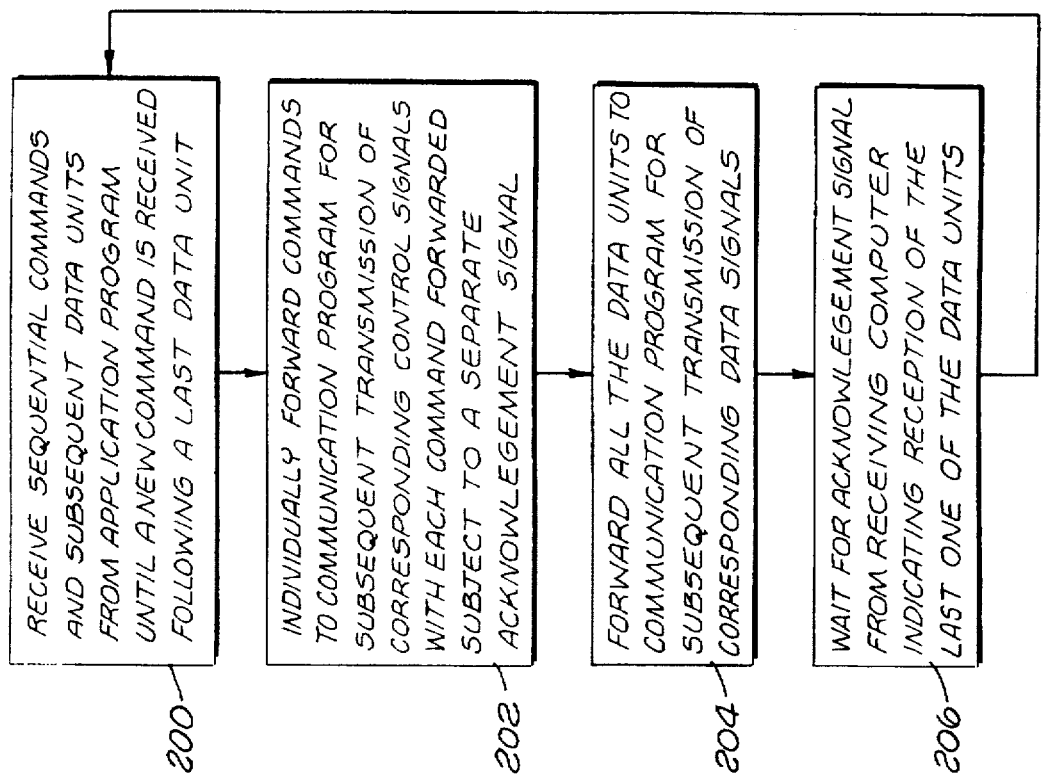
FIG. 8 is a block diagram illustrating exemplary software objects employed by the computer system of FIG. 5 for maintaining synchronization of data and control signals.

An example of one arrangement for storing and managing blocks of commands and data units is set forth in FIG. 8. Each block is represented as a software object, such as a C++ programming language object. Each object includes commands and data units represented in binary form. For each data channel in use, a single primary transmit object 300 is created. The primary object includes commands 302, data units 304 and state information 306. The command packets include commands related to convening the channel and designating which remote computers are authorized to receive information over the channel. The commands may be configured as protocol data units (PDU's). Only one object may be active for any particular channel at any one time.

In addition to a primary object 300, several secondary objects 310 may be created each including commands 302 and data units 304. The secondary objects are transitory. In other words, whereas the primary object remains in use while the channel is in use, the secondary objects are created and destroyed as needed to facilitate transference of commands and data units. For example, if additional commands and data units are received from the application program while the synchronization program is waiting for acknowledgment signals from a previous transmission of control and data signals, then many secondary objects may need to be created, each corresponding to an additional block of commands and data units. Once a given secondary block is forwarded, its status changes to active until all appropriate acknowledgment signals are received. Then, the object is discarded and the data units and commands corresponding to the next sequential object are forwarded. A link list (not separately shown) may be employed to link the primary and various secondary objects together to facilitate software management of the objects.

When operating in a receive mode, the synchronization program includes only one object per channel. The object stores received data 308 as well as lists of pending action commands 309. The single receive object remains in use while the channel is in use.

As noted, the acknowledgment signals may each be implemented as a PDU. As such, the synchronization program may create a transmit object containing one or more acknowledgment PDUs.

What has been described thus far is a method and apparatus for synchronizing control signals and data signals transmitted over separate communication lines. Principles of the invention have been described primarily with respect to a network computer system. However, principles of the invention may be advantageously applied to other applications where different types of information are transmitted over separate communication lines which may transmit the information at different rates.

With reference to the remaining figures, an alternative embodiment of the invention wherein information transmitted using separate logical channels is synchronized will now be described.

FIG. 9 illustrates a computer system 400 having a pair of computers 402 and 404 and three exemplary logical transmission channels 406, 408 and 410. In practical implementations, a far greater number of transmission channels may be employed. For clarity and simplicity in describing the invention, only three channels are illustrated in FIG. 9. The three transmission channels may be carried over a single physical connection line or over separate connections lines. The transmission rates corresponding to the three channels may differ. Accordingly, signals or information transmitted by computer 402 over channel 406 may be received by computer 404 subsequent to later transmitted signals over channel 408.

Computers 402 and 404 run three distinct computer programs: an application program 412, a communications layer program 414 and a synchronization layer program 416. The application program may be any one of a wide variety of application programs, such as a video conferencing program. Commands and data units generated by application program 412 are routed through synchronization layer 416 to communication program 414 which transmits corresponding signals over channels 406, 408 or 410. Each individual control signal or data signal, which will hereafter be referred to as a data unit or PDU, is transmitted over only one of the three available channels. The data units are received by the communication program of computer 404 then routed through the corresponding synchronization program to the application program running on computer 404. The synchronization programs, operating within both computers, insert synchronization tokens or packets, which may also be in the form of PDUs, between data units received from the respective application programs 412 prior to transmission to the corresponding communication programs 414. In particular, synchronization tokens are inserted whenever the transition is detected between the transmission of data units on one channel to another. For example, if a first set of data units are received from the application program for transmission along channel 1, then a second set is received for transmission along channel 2, the synchronization program inserts synchronization tokens for transmission on all channels between the two sets of data units. This is illustrated in FIG. 10.

FIG. 10 illustrates exemplary data units output from synchronization program 416 to communication program 414 for transmission over channels 406, 408 and 410. More specifically, FIG. 10 illustrates data units A1, A2, A3 and A4 for transmission on channel 406, data units B1 and B2 for transmission on channel 408 and data units C1, C2 and C3 for transmission on channel 410. Synchronization program 416 detects the transition between channel 406 and 408 occurring at time T1. Accordingly, at time T1, the synchronization program transmits a unique synchronization token S1 onto each of the three channels. The synchronization token may be a PDU having a unique pattern of bits. The unique pattern of bits may be generated randomly or may be assigned sequentially. Later, at time T2, the synchronization program detects a transition between data units from channel 408 back to channel 406. Accordingly, the synchronization program transmits another set of synchronization tokens, S2, on all channels. The S2 tokens are unique tokens different from the S1 tokens. Thereafter, the synchronization program detects a transition from channel 406 to 410 at time T3 and transmits another set of unique synchronization tokens, S3.

The data units and synchronization tokens are forwarded or transmitted to the communication program, which, in turn, transmits the data units over the appropriate channel and the synchronization tokens over all three channels. However, because of different channel transmission rates, the data units and tokens may be received in a different order by the communication program of computer 404.

FIG. 11 illustrates a possible sequence of received data units and synchronization tokens. As can be seen, all data units and tokens transmitted along channel 410 are received first, even though actually transmitted last. As such, synchronization tokens S1, which were transmitted at the same time by the synchronization program of computer 402 are not received at the same time by the synchronization program of computer 404. To remedy this problem, the synchronization program of computer 404 stores data units and synchronization tokens as they are received, then, by examining the synchronization tokens, realigns the data units and forwards the data units, without the synchronization tokens, to the application program of computer 404.

More specifically, the synchronization program stores all data units on all channels until corresponding synchronization tokens are detected on all channels. Thus, the synchronization program initially stores all data units until synchronization tokens S1 are received on all channels. Then, the synchronization program determines which data units were received on a channel prior to reception of the corresponding S1 token for that channel. In the example, only data units A1, A2 and A3 of channel 406 are received prior to the corresponding synchronization token S1. Data units C1, C2 and C3, and B1 and B2 are each received, on their respective channels, after the corresponding synchronization token S1. With this information, the synchronization program determines that data units A1, A2 and A3 were transmitted prior to any of the other data units. Accordingly, the synchronization program forwards data units A1, A2 and A3 to the application program before forwarding any other data units. Next, the synchronization program examines synchronization tokens S2 and determines which channel provided data prior to the corresponding S2 token for that channel. In the example, the synchronization program determines that data units B1 and B2 were transmitted prior to synchronization token S2 along channel 408 and thereby determines that data units B1 and B2 constitute the second set of transmitted data units. Accordingly, data units B1 and B2 are then forwarded to the application program. This process continues with the synchronization program examining the relative order of reception of data units in comparison with corresponding synchronization tokens to determine the relative order of transmission of all data units.

In this manner, the synchronization program realigns the received data by aligning like synchronization tokens. In other words, S1 tokens are aligned with other S1 tokens, S2 tokens are aligned with other S2 tokens, etc., as shown in FIG. 11 by dashed lines. Unique tokens are provided to allow the synchronization program to align only corresponding tokens. Appropriate software is provided within the synchronization program for examining the unique tokens, aligning the tokens, and determining therefrom the order by the data units were transmitted.

Figure 12:
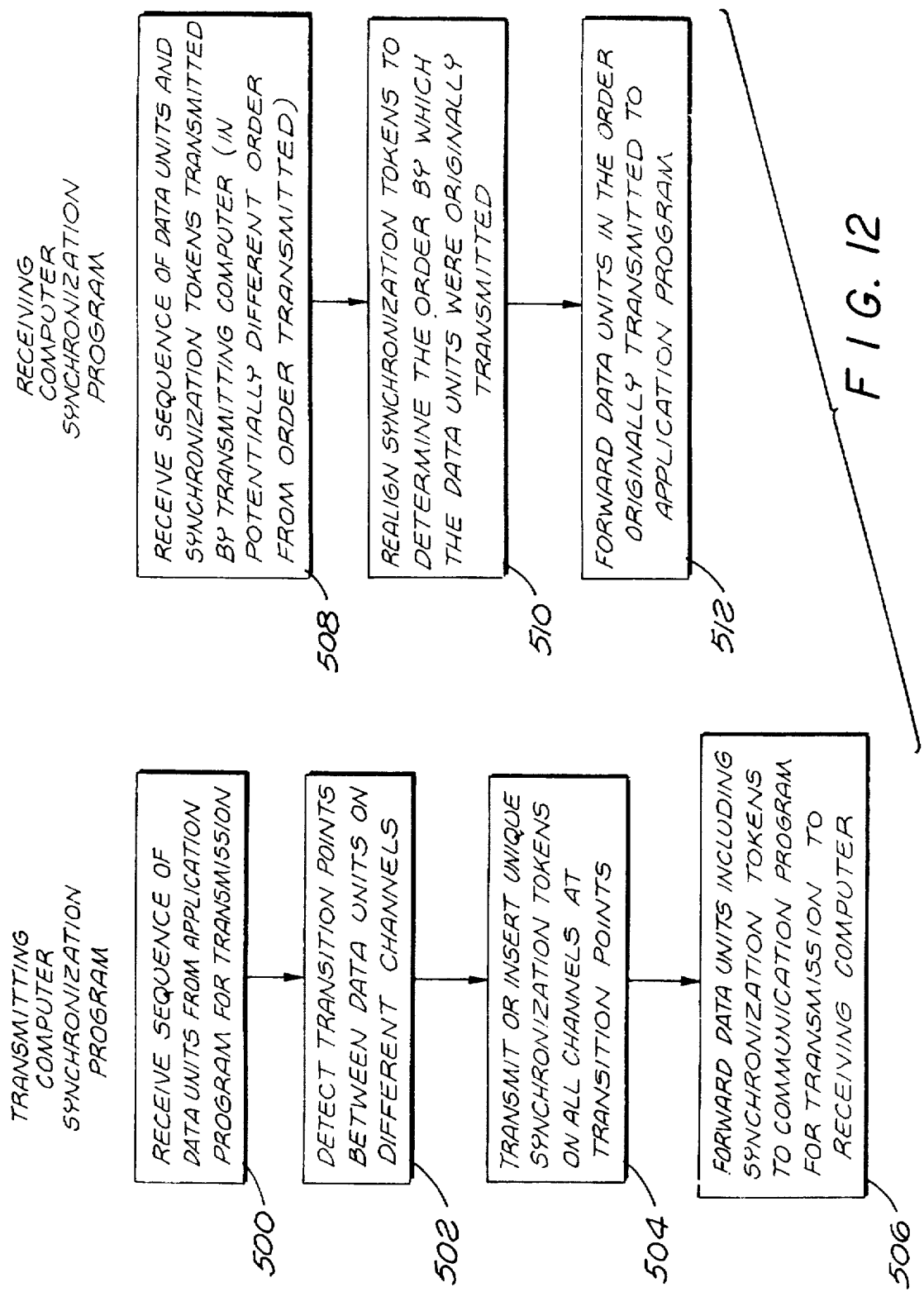
FIG. 12 is a flow chart illustrating a method performed by the system of FIG. 9 for ensuring synchronization of signals transmitted on separate channels.

The foregoing method steps are summarized in FIG. 12. On the lefthand side of FIG. 12, steps performed by the synchronization program of a transmitting computer are set forth. On the right-hand side, the steps performed by the synchronization program of the receiving computer are set forth. Initially, at step 500, the synchronization program of the transmitting computer receives a sequence of data units for transmission. Next, at step 502, the synchronization programs detects transition times between transmission of data units on different channels. The synchronization program then transmits a unique synchronization token on all data channels at transition point, step 504. Thereafter, at step 506, the data units and synchronization tokens are forwarded in order to the corresponding communication program for transmission to the receiving computer.

At step 508, the receiving computer receives data units and synchronization tokens in an order which may differ from the order transmitted. At step 510, the synchronization program of the receiving computer realigns like synchronization tokens to determine the order by which the data units were originally transmitted. Finally, at step 512, the synchronization programs forwards the data units in the order as originally transmitted to the application program of the receiving computer for processing in the order received.

In the example thus far described, all data units transmitted on all channels correspond to a single channel group. In practical systems, data units may correspond to a variety of channel groups. Moreover, any particular channel may carry data units corresponding to two or more channel groups. For a system employing two or more channels groups, separate synchronization tokens are employed for the different channel groups. This is illustrated in FIG. 13.

FIG. 13 illustrates five channels, A–E and numbered 600, 602, 604, 606 and 608. Data units corresponding to a first channel group are transmitted over channels 600, 602 and 604. Data units corresponding to a second channel group are transmitted over channels 604, 606 and 608. Hence, channel 604 carries data units corresponding to both channel groups.

The synchronization program processes data units from the different channel groups separately. A first type of synchronization token "S" is inserted or transmitted between data units on channels 600, 602 and 604 whenever a transition is detected between data units corresponding to the first channel group. The synchronization program also inserts or transmits a second type of synchronization token "M" between transitions along data channels 604, 606 and 608 of the second channel group. In FIG. 13, for clarity, the actual data units are not shown.

During resequencing, the synchronization program separately resynchronizes or aligns data units corresponding to the two different channel groups. In other words, the synchronization program aligns M tokens with other M tokens and S tokens with other S tokens. Also as shown in FIG. 13, both the S tokens and the M tokens are further distinguished from one another based upon the transition times when the tokens are generated. In other words, the S tokens include a set of three S1 tokens, set of three S2 tokens, etc. Likewise, the M tokens include a set of M1 tokens, a set of three M2 tokens, etc.

In practical implementations, numerous channel groups may be defined with respect to data units transmitted over numerous data channels. Hence, the synchronization program needs to properly distinguished between synchronization tokens corresponding to different channel groups. One suitable method is to identify each set of tokens corresponding to a particular channel group with a unique bit pattern. For example, each token may include a first bit pattern identifying the channel group and a second bit pattern for distinguishing between tokens of the same group.

Thus, a method and an apparatus has been described for synchronizing data units transmitted on separate data channels to ensure that data units are received and processed in the order transmitted. The method and apparatus may be employed within systems for which fatal errors may occur if data units are processed out of order. However, the techniques of the invention may also be advantageous employed in systems wherein, by protocol or by other means, such fatal errors are otherwise accounted for. Even in such systems, circumstances may arise wherein it is nevertheless desirable to maintain the order of data units. For example, in a video conferencing system, the data units may correspond to graphics commands for displaying information on each of the remote computers connected to the video conference. Without resynchronizing the graphics commands, the graphics operations may be performed on different computers in different orders. For example, a user may draw a graphics image then draw a strike through mark indicating that the image is incorrect and should be ignored. However, without proper synchronization, the receiving computers may first display the strike through mark before the graphics image is displayed, causing confusion and annoyance.

Hence, application of the invention is not limited solely to systems where fatal software errors may occur if proper synchronization is not maintained. Indeed, principles of the invention may be applied to a wide range of systems, including manufacturing systems, wherein different units are conveyed or transmitted along separate channels. In the manufacturing context, physical synchronization tokens may be placed onto assembly lines moving at different speeds to allow workers retrieving the items from the assembly lines to determine the proper order of the items.

In general, principles of the invention may be applied to a wide range of applications and to solve a wide range of problems in addition to those specifically described herein. Accordingly, the exemplary embodiments set forth herein should be regarded as being merely illustrative of the principles of the invention and should not be construed as limiting the scope of the invention.

What is claimed is:

1. In a computer network including a first computer communicatively coupled with at least a second computer through data and control channels having a first and a second independently variable transmission rates, a communication program and an application program are provided within each of the first and the second computer wherein the communication program is communicatively disposed between the application program and the data and control channels, an improvement comprising:
   providing a synchronization program within each of the first computer and the second computer functionally disposed between the application program and the communication program within each the first computer and the second computer, said synchronization program including
   means for sequentially forwarding commands and data units received from the application program to the communication program for transmission to other computer(s) as corresponding control and data signals on the control and data channels at said second and first independently variable transmission rates, respectively, and
   means for synchronizing the control signals sent on the control channels at said second independently variable transmission rate with the data signals sent on the data channels at said first independently variable transmission rate by deferring sequential forwarding of a next sequential command to the communication program until an acknowledgment is received from the other comtputer(s) acknowledging receipt of all previously transmitted control and data signals.

2. The improvement of claim 1 wherein the acknowledgment includes one acknowledgment signal corresponding to each previously transmitted control signal and a further acknowledgment signal corresponding to a last one of the previously transmitted data signals.

3. The improvement of claim 1 wherein the communication program is a multi-point communication services program.

4. A synchronization program for use with a communication program within a computer, said computer connected to at least one other computer by data and control channels having a first and a second independently variable transmission rates, said synchronization program comprising:
   means for sequentially forwarding commands and data units to the communication program for transmission at said second and first transmission rates as corresponding control and data signals on the corresponding control and data channels, respectively, to one of the at least one other computer; and
   means for synchronizing control signals transmitted on the control channel at said second independently variable transmission rate with data signals transmitted on the data channel at said first independently variable transmission rate by deferring sequential forwarding of a next sequential command to the communication program until separate acknowledgments are received from said at least one other computer acknowledging receipt of all previously transmitted control signals and a last one of previously transmitted data signals.

5. The synchronization program of claim 4 further comprising:
   means for detecting reception by the communication program of control and data signals transmitted from said at least one other computer; and
   means for transmitting a separate acknowledgment signal to said one of the at least one other computer upon detection of reception of each control signal and the last one of the previously transmitted data signals.

6. A method for synchronizing control signals transmitted on a control channel at a first independently variable transmission rate with data signals transmitted on a data channel at a second independently variable transmission rate, said method comprising the steps of:
   generating control signals and data signals for transmission over the control and data channels at said first and second independently variable transmission rates, respectively;
   transmitting a first sequence of control signals on the control channel at said first independently variable transmission rate by separately transmitting each of said first sequence of control signal at said first independently variable transmission rate and waiting for an acknowledgment from a receiving computer before transmitting a next control signal at said first independently variable transmission rate in the first sequence of control signals; and
   transmitting a first sequence of data signals on the data channel at said second independently variable transmission rate followed by a second control signal on the control channel at said first independently variable transmission rate by sequentially transmitting all of said first sequence of data signals at said second independently variable transmission rate and waiting for an acknowledgment from the receiving computer acknowledging receipt of the last of the first sequence of data signals before transmitting the second control signal at said first independently variable transmission rate.

7. A computer network comprising:

two or more computers;

an interconnection medium including a data channel for transmitting data signals at a first independently variable transmission rate, and a control channel for transmitting control signals at a second independently variable transmission rate;

a multi-point communications software layer (MCS), running within each computer, for transmitting said control signals on said control channel at said second independently variable transmission rate and said data signals on said data channel at said first independently variable transmission rate; and an interface software layer executing within each computer, including a transmission element for sequentially forwarding commands and data units to the multi-point communications layer of the same computer for transmission as corresponding control and data signals on said control and data channels at said second and first independently variable transmission rates, respectively; and a delay element for deferring transmission of a next sequential command to the multi-point communications layer of the same computer until separate acknowledgments are received from a receiving one of the other computers acknowledging receipt of all previously transmitted control signals and a last data signal of previously transmitted data signal.

8. The network of claim 7 wherein each interface software layer further includes:

a receive element for detecting reception, by the communications program, of control and data signals transmitted from a transmitting computer; and an acknowledgment element for transmitting a separate acknowledgment signal to the transmitting computer upon detection of reception of each control signal and the last one of the previously transmitted data signals.

9. The network of claim 7 wherein the network transmits control signals and data signals corresponding to a plurality of channels and wherein control signals and data are resynchronized separately for each individual channel.

10. The computer network of claim 7 wherein a sequential group of commands followed by all data units prior to a next command collectively comprises a software object.

11. The network of claim 10 wherein, for each channel, an initial object remains in use until the channel is closed and wherein all subsequent objects are transitory and are discarded once acknowledgments are received acknowledging receipt of the control and data signals within the object.

12. The network of claim 10 wherein each software object further includes state information including an indication of whether the object is currently active or inactive, wherein an active object is an object for which all necessary acknowledgments have not yet been received.

13. In a system for transmitting units of information over a plurality of transmission channels having first and second independently varying transmission rates, each unit of information corresponding to only one transmission channel, an improvement comprising:

transmitting a unique synchronization token on all transmission channels at all transition points between transmission of units of information on a first of the transmission channels at a first independently variable transmission rate and transmission of units of information on a second of the transmission channels at a second independently variable transmission rate, wherein the system is operative to synchronize units of information transmitted on the first transmission channel at said first independently variable transmission rate with units of information transmitted on the second transmission channel at said second independently variable transmission rate employing said synchronization tokens.

14. A method for maintaining synchronization of data transmitted over a plurality of transmission channels having first and second independently variable transmission rates, said method comprising the steps of:

receiving a sequence of units of data for transmission on the plurality of transmission channels, with each unit of data associated with a single transmission channel;

sequentially transmitting units of data associated with a first transmission channel on the first transmission channel at the first independently variable transmission rate until units of data associated with a second transmission channel are detected;

transmitting a synchronization token on all transmission channels;

sequentially transmitting units of data associated with the second transmission channel on the second transmission channel at the second independently variable transmission rate until units of data associated with another transmission channel are detected, and transmitting a synchronization token on all transmission channels; and continuing in this manner until all units of data of said sequence of units of data are transmitted.

15. The method of claim 14 including the further steps of receiving and resynchronizing units of data by performing the steps of:

receiving and storing units of data and synchronization tokens;

examining the order of reception of units of data and synchronization tokens and determining therefrom the order by which the units of data were transmitted; and outputting the units of data in the order transmitted.

16. A computer network comprising:

two or more computers;

a plurality of channels interconnecting said two or more computers, said channels having first and second independently variable transmission rates;

a communication program, running within each computer, for receiving data units from a corresponding application program also running on each computer, and transmitting said data units on said plurality of channels at said first and second independently variable transmission rates; and a synchronization program, provided within each computer and functionally disposed between the communication program and the corresponding application program, each of said synchronization programs including an element for receiving a sequence of units of data for transmission on the plurality of channels, with each unit of data associated with a single channel;

an element for sequentially transmitting units of data associated with a first channel on the first channel at the first independently variable transmission rate until units of data associated with a second channel are detected;

an element for transmitting a synchronization token on all channels; and an element for sequentially transmitting units of data associated with the second channel on the second channel at the second independently variable transmission rate until units of data associated with another channel is detected, and transmitting a synchronization token on all channels.

17. The method of claim 16 wherein the synchronization program further includes:

an element for receiving and storing units of data and synchronization tokens;

an element for examining the order of reception of units of data and synchronization tokens and determining therefrom the order by which the units of data were transmitted; and an element for outputting the units of data in the order transmitted.

18. An apparatus for maintaining synchronization of units of data transmitted over a plurality of channels having first and second independently variable transmission rates, said apparatus comprising:

means for receiving a sequence of units of data for transmission on the plurality of channels, with each unit of data associated with a single channel;

means, responsive to said receiving, for sequentially transmitting units of data associated with a first channel on the first channel at the first independently variable transmission rate until units of data for transmission on a second channel are detected; and means, responsive to said detection, for transmitting a synchronization token on each of the plurality of channels.

19. The apparatus of claim 18 further comprising:

means for receiving and storing units of data and synchronization tokens;

means for examining the order of reception of units of data and synchronization tokens and determining therefrom the order by which the units of data were transmitted; and means for outputting the units of data in the order transmitted.

* * * * *